(12) United States Patent
Gretz (10) Patent No.: US 7,816,604 B1
(45) Date of Patent: Oct. 19, 2010

(54) RECESSED LOW VOLTAGE MOUNTING ASSEMBLY

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 277 days.

(21) Appl. No.: 12/284,288

(22) Filed: Sep. 19, 2008

Related U.S. Application Data (63) Continuation of application No. 11/980,063, filed on Oct. 30, 2007, now Pat. No. 7,435,900, which is a continuation-in-part of application No. 11/655,299, filed on Jan. 19, 2007, now Pat. No. 7,294,781, which is a continuation-in-part of application No. 11/356,590, filed on Feb. 16, 2006, now Pat. No. 7,166,801, which is a continuation-in-part of application No. 11/264,857, filed on Nov. 2, 2005, now Pat. No. 7,045,713, which is a continuation-in-part of application No. 11/246,985, filed on Oct. 7, 2005, now Pat. No. 7,064,271, which is a continuation-in-part of application No. 11/185,256, filed on Jul. 20, 2005, now Pat. No. 7,115,820, which is a continuation-in-part of application No. 11/102,392, filed on Apr. 8, 2005, now Pat. No. 7,151,219, which is a continuation-in-part of application No. 11/070,344, filed on Mar. 2, 2005, now Pat. No. 6,965,078, which is a continuation-in-part of application No. 11/009,116, filed on Dec. 10, 2004, now Pat. No. 7,005,578, which is a continuation-in-part of application No. 10/863,942, filed on Jun. 9, 2004, now Pat. No. 6,956,171.

(51) Int. Cl.
*H01H 9/02* (2006.01)

(52) U.S. Cl. ............................. 174/58; 174/60; 174/61; 174/135; 439/535; 248/343

(58) Field of Classification Search .................. 174/58, 174/59, 61, 64, 135, 50; 439/535; 248/343, 248/906; 220/4.02, 3.2, 3.3; 52/317
See application file for complete search history.

(56) References Cited

U.S. PATENT DOCUMENTS

| 4,019,647 | A | * | 4/1977 | Arnold | 220/3.3 |
|---|---|---|---|---|---|
| 4,059,327 | A | | 11/1977 | Vann | |
| 4,638,963 | A | * | 1/1987 | Hernandez | 248/56 |
| 4,936,794 | A | | 6/1990 | Shaw et al. | |
| 4,988,832 | A | | 1/1991 | Shotey et al. | |
| 4,993,575 | A | * | 2/1991 | Maes | 220/3.8 |

(Continued)

*Primary Examiner*—Dhiru R Patel (57) ABSTRACT

A recessed low voltage mounting assembly including a low voltage mounting bracket and a trim plate for installing a low voltage electrical component in either old work or new construction. Two options are provided for mounting the assembly to the wall. In new construction, two captive fasteners in the mounting bracket are available to be driven into a stud or other framework of the building. In an old work situation, rotatable flags are provided for securing the assembly to the wall. Adjustment screws for rotating and tightening the flags are accessible through apertures in the trim plate. The assembly recesses the low voltage component behind the wall surface, thereby enabling placement of low voltage devices in close proximity to the wall and mounting assembly. A second embodiment provides a one-piece version of the low voltage mounting assembly in which the trim plate is integral with the bracket.

20 Claims, 8 Drawing Sheets

U.S. PATENT DOCUMENTS 5,347,088 A * 9/1994 Marsh et al. .................. 174/50
6,229,087 B1 * 5/2001 Archer ....................... 174/50
6,737,576 B1 5/2004 Dinh
7,044,318 B2 5/2006 Gates, II

* cited by examiner

RECESSED LOW VOLTAGE MOUNTING ASSEMBLY

This application is a Continuation of U.S. patent application Ser. No. 11/980,063 filed Oct. 30, 2007, now U.S. Pat. No. 7,435,900, which is a Continuation-In-Part of U.S. patent application Ser. No. 11/655,299 filed Jan. 19, 2007, now U.S. Pat. No. 7,294,781, which is a Continuation-In-Part of U.S. patent application Ser. No. 11/356,590 filed Feb. 16, 2006 and now U.S. Pat. No. 7,166,801, which is a Continuation-In-Part of U.S. patent application Ser. No. 11/264,857, filed Nov. 2, 2005 and now U.S. Pat. No. 7,045,713, which is a Continuation-In-Part of U.S. patent application Ser. No. 11/246,985, filed Oct. 7, 2005 and now U.S. Pat. No. 7,064,271, which is a Continuation-In-Part of U.S. patent application Ser. No. 11/185,256, filed Jul. 20, 2005 and now U.S. Pat. No. 7,115,820, which is a Continuation-In-Part of U.S. patent application Ser. No. 11/102,392, filed Apr. 8, 2005 and now U.S. Pat. No. 7,151,219, which is a Continuation-In-Part of U.S. patent application Ser. No. 11/070,344, filed Mar. 2, 2005 and now U.S. Pat. No. 6,965,078, which is a Continuation-In-Part of U.S. patent application Ser. No. 11/009,116 filed Dec. 10, 2004 and now U.S. Pat. No. 7,005,578, which is a Continuation-In-Part of U.S. patent application Ser. No. 10/863,942 filed Jun. 9, 2004 and now U.S. Pat. No. 6,956,171, all of which are commonly owned by the assignee of the present invention and the entire contents of which are incorporated herein by reference.

FIELD OF THE INVENTION

This invention relates to electrical junction boxes and specifically to a recessed low voltage mounting assembly that recesses a low voltage electrical component within the wall of a building.

BACKGROUND OF THE INVENTION

Recessed electrical boxes for retrofitting on finished walls or for use in new construction were disclosed in U.S. Pat. Nos. 6,965,078, 6,956,171, 7,005,578, 7,045,713, 7,064,271, 7,115,820, 7,151,219, 7,166,801, and 7,294,781, and in co-pending U.S. application Ser. No. 11/980,063, all of which are commonly owned by the assignee of the present invention and the entire contents of which are incorporated herein by reference.

The recessed electrical boxes disclosed in the aforementioned patents and applications comprised an electrical box having an inner enclosure for housing an electrical device and an outer enclosure for recessing the inner enclosure well within a wall. The recessed electrical box including the inner enclosure and outer enclosure were either integrally formed in one piece or provided in two pieces each formed of the same material of construction.

Although a recessed electrical box of the type described in the aforementioned disclosures provided an adequate means for recessing an electrical device substantially within the wall of a structure, they were directed primarily to recessing high voltage devices within the wall of a building. Although the aforementioned patents and patent application provide an apparatus for recessing a high voltage device within the wall of a structure, there is also a need for recessing a low voltage device within wall of a structure.

Accordingly, the present invention provides a recessed low voltage mounting assembly that includes a first portion that comprises a low voltage mounting bracket for securing to a wall and housing and protecting a low voltage device and its associated wiring. A second portion of the recessed low voltage mounting assembly includes a trim plate for covering the low voltage mounting bracket and a portion of the wall surrounding the bracket to obscure that portion of the wall surrounding the low voltage device.

SUMMARY OF THE INVENTION

The invention is a recessed low voltage mounting assembly including a low voltage mounting bracket and a trim plate for installing a low voltage electrical component in either old work or new construction. A first embodiment of the assembly includes two options for mounting to the wall. In new construction, two captive fasteners in the mounting bracket can be driven into a stud or other framework of the building. The trim plate is then secured to the mounting bracket to provide an attractive recessed area for enclosing a low voltage component. In an old work situation, rotatable flags are provided for securing the assembly to the wall. Adjustment screws for rotating and tightening the flags are accessible through apertures in the trim plate. The trim plate includes a laterally extending flange that covers the wall surface surrounding the bracket and enables blocking the unsightly boundary area between the bracket and wall. The assembly recesses the low voltage component behind the wall surface, thereby enabling placement of low voltage devices in close proximity to the wall and mounting assembly. A second embodiment provides a one-piece version of the low voltage mounting assembly in which the trim plate is integral with the bracket.

OBJECTS AND ADVANTAGES

Several advantages are achieved with the recessed low voltage mounting assembly of the present invention, including:
(1) A first advantage of the recessed low voltage mounting assembly is that it properly recesses a low voltage component at the proper depth from the wall surface.
(2) The assembly provides a means of recessing low voltage components from the wall surface thereby enabling placement of low voltage components in close proximity to the wall.
(3) A two piece embodiment of the assembly enables recessing of a low voltage component in either an old work or new construction situation.
(4) A two piece embodiment of the assembly provides two fastening options for added convenience in mounting the assembly to the wall including captive fasteners for new construction and rotatable flags for an old work installation.
(5) The rotatable flags are accessible from the front of the assembly to enable tightening of the low voltage assembly to the wall after initial installation if desired or remounting of the assembly if a new wall covering or layer is installed.
(6) A one piece version of the assembly can be manufactured at lower cost and includes rotatable flags primarily for an old work installation.

These and other objects and advantages of the present invention will be better understood by reading the following description along with reference to the drawings.

TABLE OF NOMENCLATURE

The following is a listing of part numbers used in the drawings along with a brief description:

| Part Number | Description |
|---|---|
| 20 | recessed low voltage mounting assembly |
| 22 | low voltage mounting bracket |
| 24 | trim plate |
| 26 | low voltage component |
| 28 | long sidewall |
| 30 | short sidewall |
| 32 | enclosure |
| 34 | lateral peripheral wall |
| 35 | front face of lateral peripheral wall |
| 36 | front edge of sidewalls |
| 38 | longitudinal wall |
| 40 | rear opening |
| 42 | low voltage boss |
| 44 | wide flange |
| 46 | threaded bore in wide flange |
| 47 | aperture in wide flange |
| 48 | double-walled extension |
| 50 | opening |
| 52 | short lateral wall |
| 54 | aperture in short lateral wall |
| 56 | captive fastener |
| 58 | longitudinal brace |
| 60 | rear edge of longitudinal wall |
| 62 | lateral flange |
| 64 | rearward extending peripheral flange |
| 66 | short side of trim plate |
| 68 | long side of trim plate |
| 70 | first aperture |
| 72 | second aperture |
| 74 | countersunk area |
| 76 | trim plate fastener |
| 77 | fastening arrangement |
| 78 | flag adjustment screw |
| 80 | head of flag adjustment screw |
| 82 | bore in flag |
| 84 | flag |
| 86 | flat face |
| 87 | mounting arrangement |
| 88 | fastener for low voltage component |
| 90 | bore in low voltage boss |
| 92 | brace member |
| 94 | groove |
| 96 | flag in counterclockwise position |

-continued

| Part Number | Description |
|---|---|
| 98 | flag in clockwise position |
| 100 | alignment tab |
| 102 | recessed area |
| 104 | wall |
| 106 | stud |
| 107 | second mounting arrangement |
| 108 | drywall |
| 110 | rear face of lateral flange |
| 200 | recessed low voltage mounting assembly |
| 202 | low voltage mounting bracket |
| 204 | trim plate |
| 205 | threaded portion of flag adjustment screw |
| 206 | mounting arrangement |
| 208 | thick wall portion |
| 210 | aperture |
| 212 | corner brace |
| 214 | sidewall edges |
| 216 | horizontal brace |
| 218 | rear edge of short sidewall |
| 220 | vertical brace |
| D1 | distance tab will offset mounting bracket from stud |
| $\theta_1$ | angle of fastener with respect to front edge of sidewall |

DETAILED DESCRIPTION OF THE INVENTION

Figure 1:
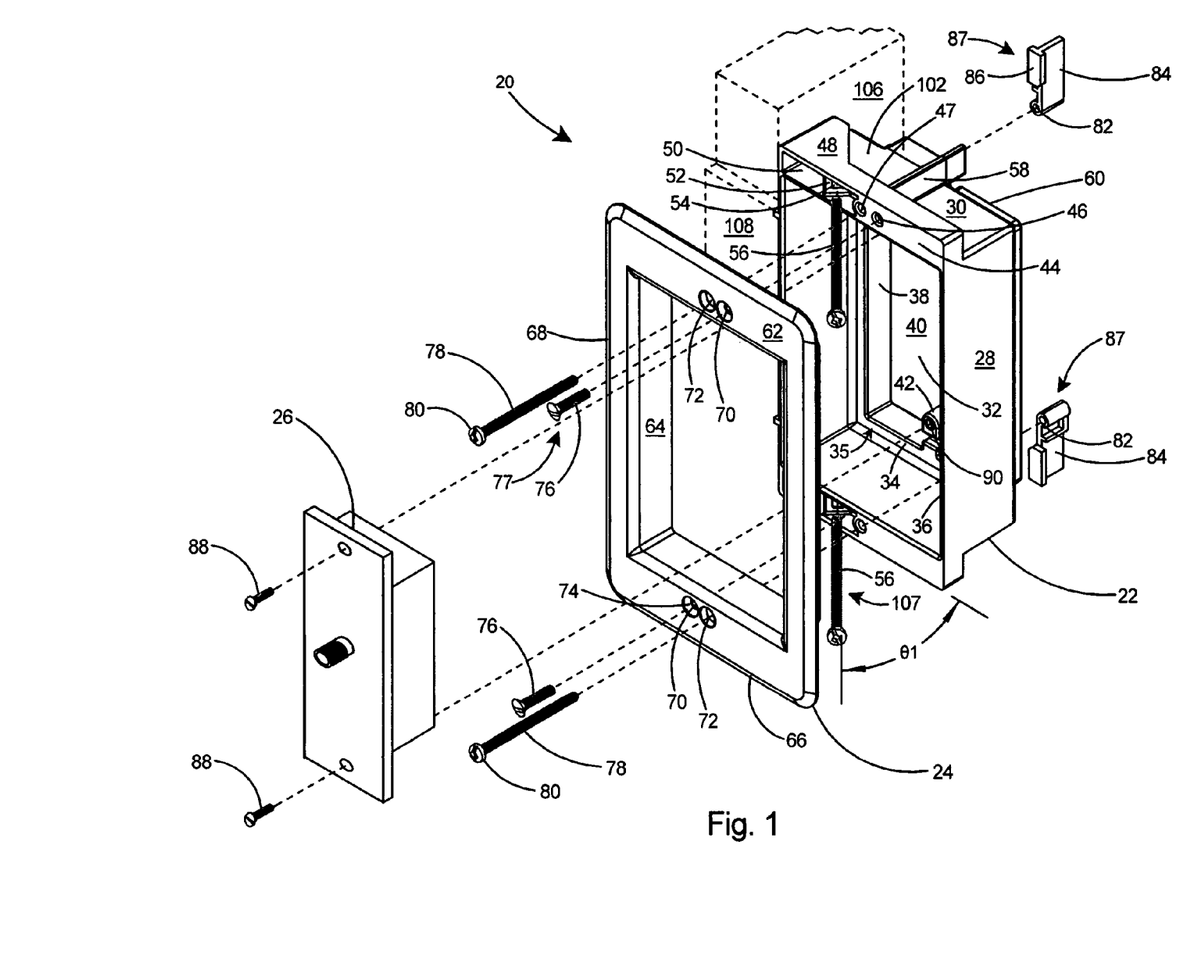
FIG. 1 is a front exploded perspective view of a recessed low voltage mounting assembly according to the present invention.

With reference to FIG. 1, the present invention comprises a recessed low voltage mounting assembly 20 for securing a low voltage component on a wall. A first and preferred embodiment of the recessed mounting assembly 20 includes a low voltage mounting bracket 22 and a trim plate 24. The recessed low voltage mounting assembly 20 enables the recessed mounting of a low voltage component 26, such as the coaxial connector depicted in FIG. 1, on either a new wall under construction or on an existing wall.

The low voltage mounting bracket 22 includes long sidewalls 28 and short sidewalls 30 that define a low voltage enclosure 32 therein. A lateral peripheral wall 34 having a front face 35 is provided offset at a distance from the front edge 36 of the side walls 28 and 30 and extends into the enclosure 32. A longitudinal wall 38 extends rearward from the lateral peripheral wall 34 and frames a rear opening 40. Low voltage bosses 42 extend into the enclosure 32 from opposite sides of the longitudinal wall 38.

A wide flange 44 extends outward along the front edge 36 of the short sidewalls 30 and includes a threaded bore 46 and an aperture 48 therein. Beyond the aperture along the short sidewalls 30 a double-walled extension 48 includes an opening 50 therein. A short lateral wall 52 extends between the two walls of the double-walled extension 48 and includes an aperture 54 therein. A captive fastener 56 extends from and is held therein in the aperture 54. The short lateral wall 52 is at an angle with respect to the front edge 36 of the sidewalls 30 and thereby positions the captive fasteners 56 at an angle $\theta_1$ with respect to the front edge 36. Preferably the captive fasteners 56 are at an angle $\theta_1$ of between 40 and 50 degrees with respect to the front edge of said sidewalls 28 and 30. A longitudinal brace 58 extends rearward longitudinally from the rear of the wide flange 44 to the rear edge 60 of the longitudinal wall 38.

The trim plate 24 includes a lateral flange 62 and a rearward extending peripheral flange 64. The trim plate 24 includes opposing short sides 66 and opposing long sides 68. Each side of the opposing short sides 66 includes a first aperture 70 and second aperture 72 therein. The rearward extending peripheral flange 64 of the trim plate 24 is of a slightly smaller size than the enclosure 32 defined by the inner surfaces of the long 28 and short sidewalls 30 and the trim plate 24 therefore aligns with and nests within the low voltage mounting bracket 22 when it is pressed therein. The first apertures 70 include countersunk areas 74 and accept trim plate fasteners 76 for securing the trim plate 24 to the low voltage mounting bracket 22. The trim plate fasteners 76 provide a fastening arrangement 77 for securing the trim plate 24 to the low voltage mounting bracket 22. Flag adjustment screws 78 include heads 80 that extend through the second apertures 72. The second apertures 72 are of a diameter larger than the diameter of the heads 80 of the flag adjustment screws 78 thereby allowing the flag adjustment screws 78 to turn freely in the second apertures 72 even after the trim plate 24 is secured to the low voltage mounting bracket 22. The flag adjustment screws 78 are threaded through bores 82 in flags 84. Each flag 84 includes a flat face 86 thereon that is parallel with the front edge 36 of the low voltage bracket 22. The flag adjustment screws 78 and flags 84 form a mounting arrangement 87 for mounting the low voltage mounting assembly to a wall. The mounting arrangement 87 includes rotatable flags 84 that may be rotated to draw the flags 84 toward the trim plate 24 for securing the recessed low voltage mounting assembly 20 to a wall (not shown). Alternatively, the low voltage mounting bracket 22 may be secured to a stud (not shown) with captive fasteners 56 and the trim plate 24 then secured to the bracket 22 to provide a finished mounting assembly 20 on a wall. A low voltage component 26 may then be secured by fasteners 88 to bores 90 in the low voltage bosses 42.

Figure 2:
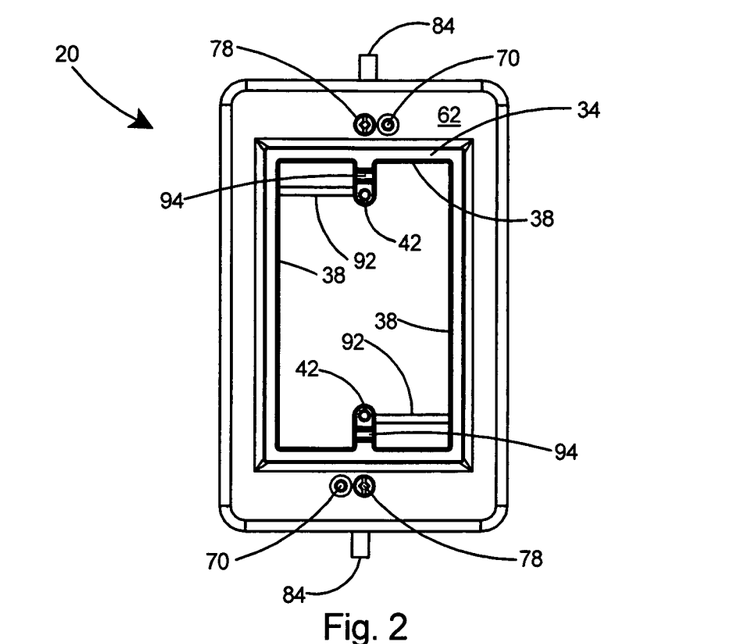
FIG. 2 is a front elevation view of the recessed low voltage mounting assembly of FIG. 1.
Figure 3:
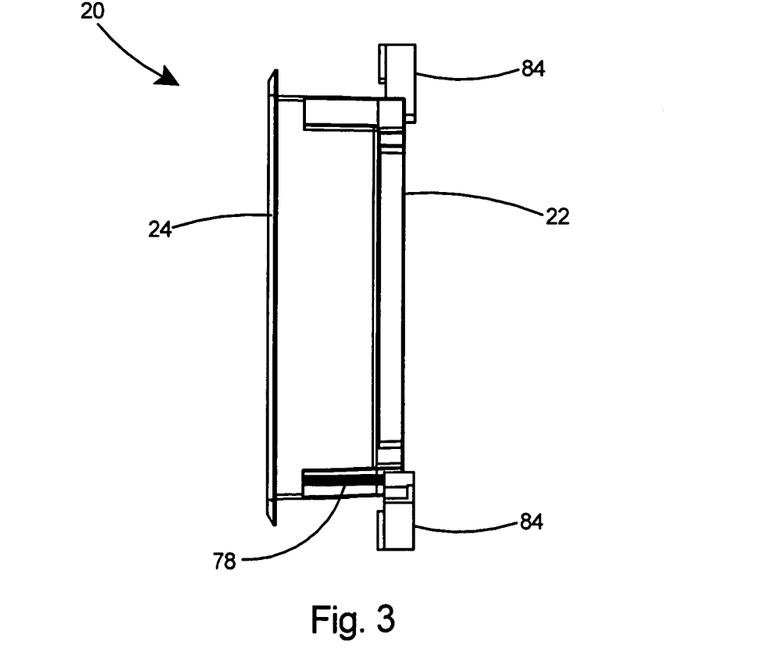
FIG. 3 is a side view of the recessed low voltage mounting assembly of FIG. 1.

Referring to the front view of the recessed low voltage mounting assembly 20 in FIG. 2, the bosses 42 extending from the longitudinal wall 38 include brace members 92 extending there between each boss 42 and the longitudinal wall 38 to brace and strengthen the bosses 42. Grooves 94 are provided laterally along the face of each boss 42 to provide an open area for accommodating the edge of a low voltage component (not shown). The rotatable flags 84 are shown in FIGS. 2 and 3 rotated fully clockwise by the flag adjustment screws 78.

Figure 4:
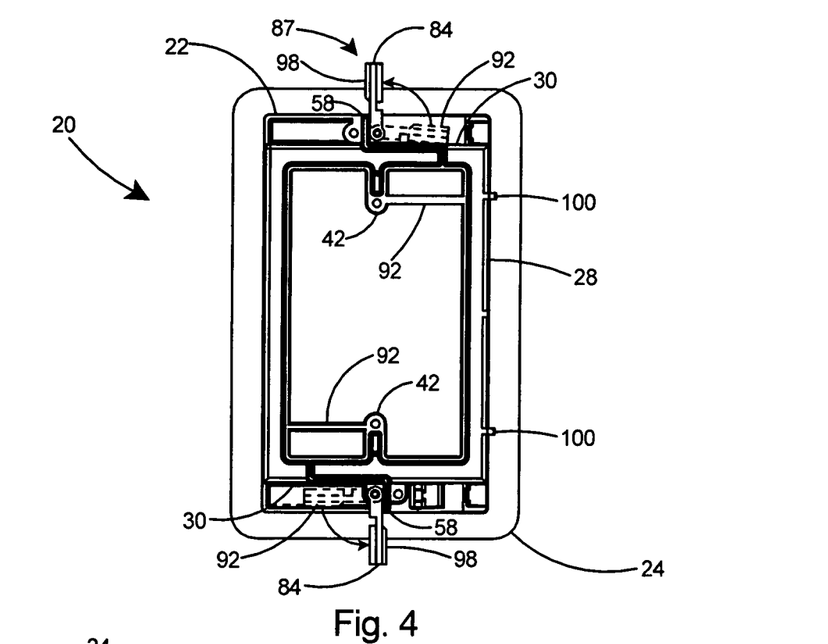
FIG. 4 is a back view of the recessed low voltage mounting assembly of FIG. 1.

As shown in FIG. 4, the rotatable flags 84 can be rotated from a counterclockwise position 96 (in phantom lines), wherein the flags 84 are essentially flush against the short sidewalls 30, to a clockwise position 98 (in solid lines) in which the flags 84 butt against the longitudinal brace 58 and are thereby essentially perpendicular with respect to the short sidewalls 30. The longitudinal brace 58 thereby provides a stop for stopping the rotation of the rotatable flags 84 when they are rotated clockwise and stops the flags 84 when they are extended perpendicular to the sidewalls 30. Alignment tabs 100 extend outwards from one long sidewall 28 of the low voltage mounting bracket 22 to provide an alignment mechanism for aligning the low voltage mounting bracket 22 at a proper depth with respect to a stud (not shown) so that the front edge of the bracket 22 will align flush with the eventual face of the drywall when the bracket assembly 20 is used in new construction.

Figure 5:
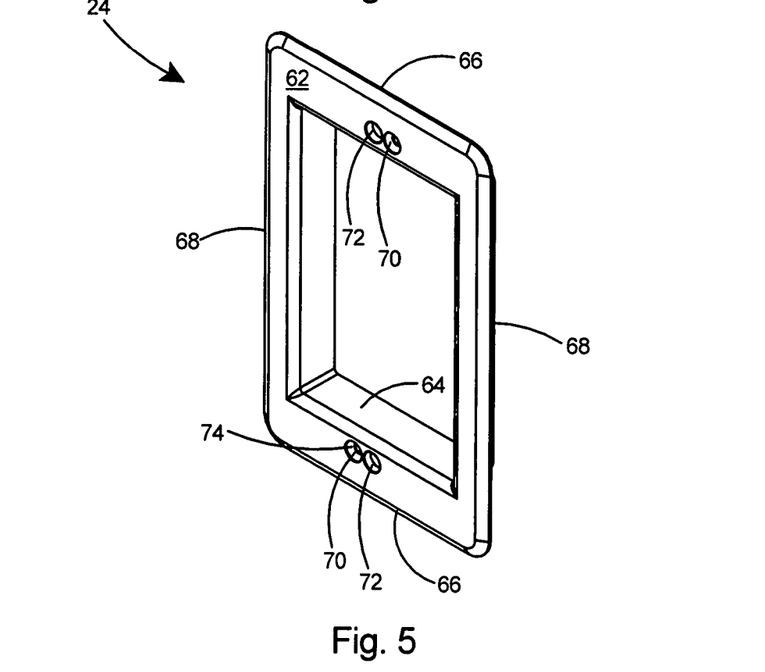
FIG. 5 is a front perspective view of the trim plate portion of the recessed low voltage mounting assembly of FIG. 1.
Figure 6:
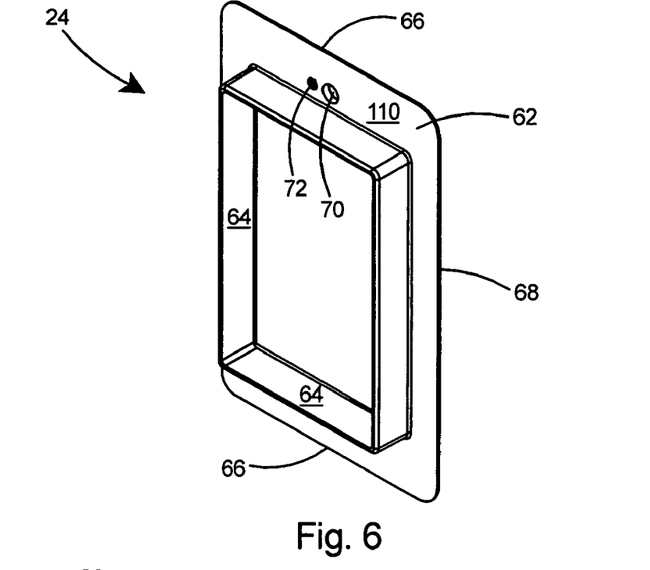
FIG. 6 is a rear perspective view of the trim plate depicted in FIG. 5.

The trim plate 24, as shown in FIGS. 5 and 6, includes the lateral flange 62, the rearward extending peripheral flange 64, opposing short sides 66, and opposing long sides 68. First apertures 70 extending through the lateral flange 62 include countersunk areas 74 and second apertures 72 are provided for later accommodating the flag adjustment screws.

Figure 7:
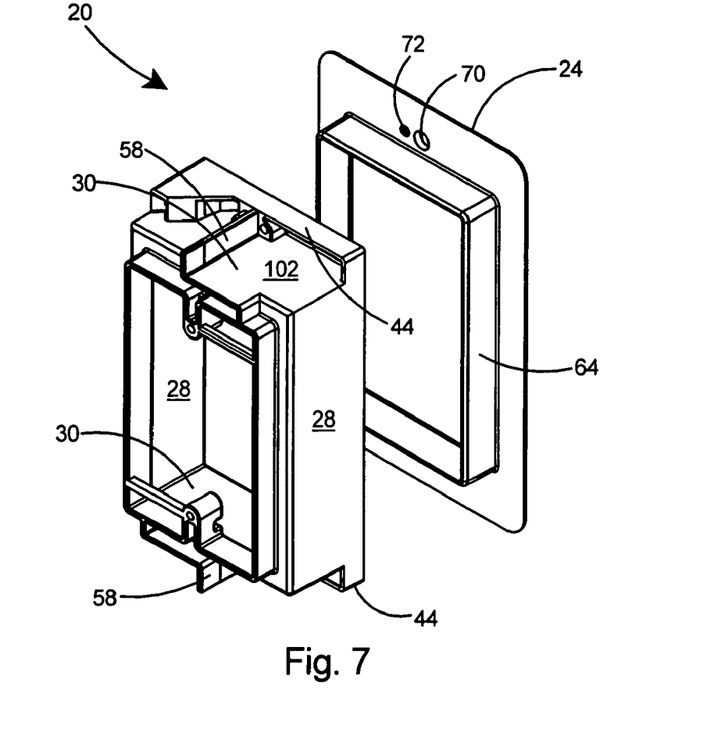
FIG. 7 is a rear exploded perspective view of the recessed low voltage mounting of the present invention.

As shown in FIG. 7, the trim plate 24 mates with the low voltage mounting bracket 22. The rearward extending peripheral flange 64 of the trim plate 24 nests within the front opening of the low voltage mounting bracket 22 defined by the short sidewalls 30 and long sidewalls 28. A recessed area 102 is defined by the longitudinal brace 58 and the wide flange 44 provides space for the flags (not shown) to nest when rotated counterclockwise or to the open position. Thus the flags will be positioned flush against the short sidewalls 30 and will not interfere with insertion of the box within a hole in a wall.

Figure 8:
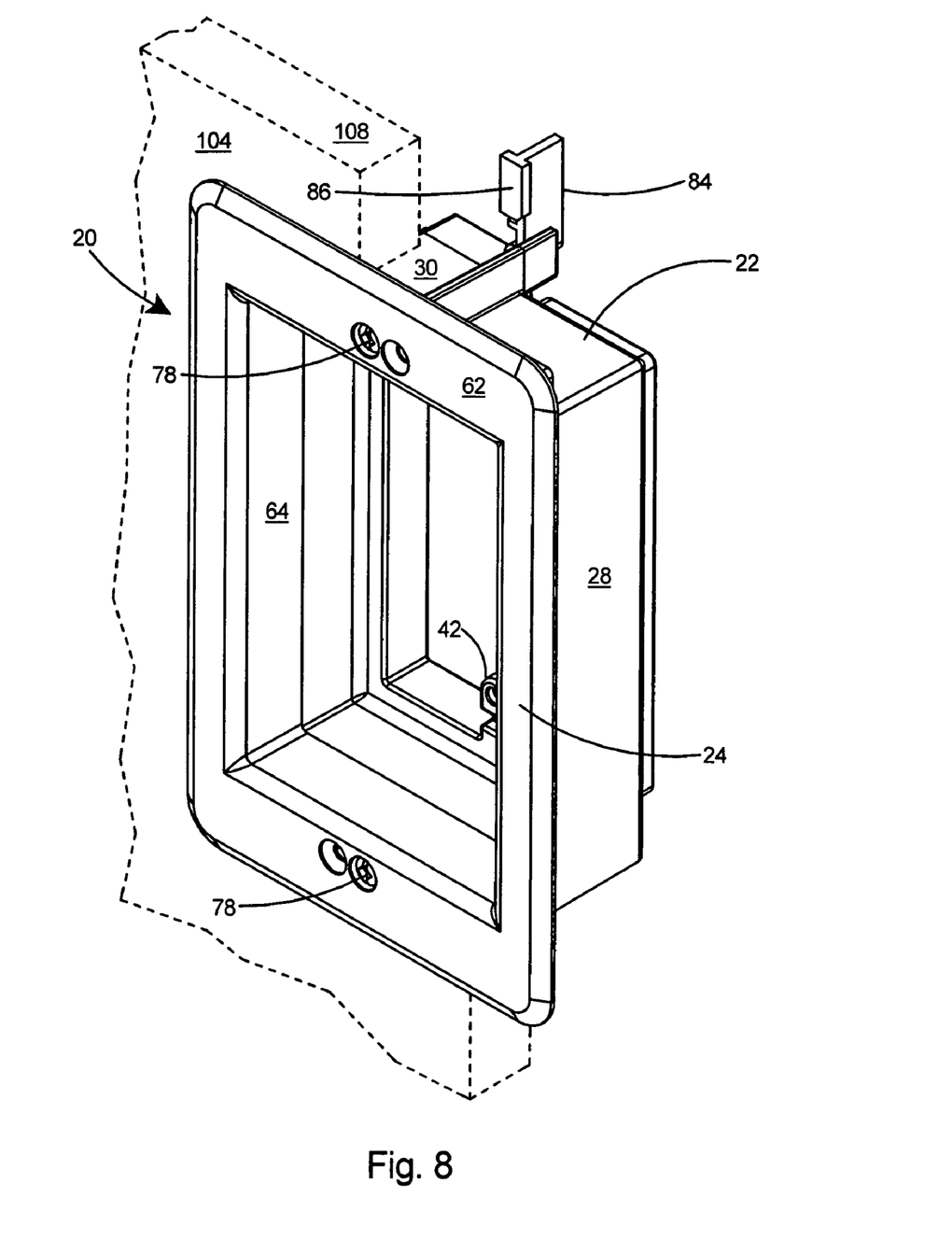
FIG. 8 is a front perspective view of the recessed low voltage mounting assembly of FIG. 1 after the trim plate has been secured to the low voltage bracket.

With reference to FIG. 8 for the operation of the recessed low voltage mounting assembly 20 in an old work situation, the rotatable flags 84 are initially rotated counterclockwise or flush against the short sidewalls 30 of the low voltage mounting bracket 22. The recessed low voltage mounting assembly 20 is then inserted into the existing hole in the wall 104, a portion of which the wall 104 and the drywall 106 are shown. The flag adjustment screws 78 are then rotated clockwise and tightened until the assembly 20 is clamped to the wall 104 by the flat face 86 of the flags 84 and the lateral flange 62 pressing on opposing sides of the wall 104.

With reference to FIG. 1, an alternative mode of operation of the recessed low voltage mounting assembly 20 is available if desired for new construction. In this case, the low voltage mounting bracket 22 is pressed flush against a stud 106 and the captive fasteners 56, which provide a second mounting arrangement 107 for securing the low voltage mounting assembly 20 to a wall, are driven into the stud 106. After the drywall 108 is secured to the face of the studs 106, the trim plate 24 is then secured to the low voltage mounting bracket 22 with fasteners 76. A low voltage component 26 can then be installed within the recessed enclosure 32.

Figure 9:
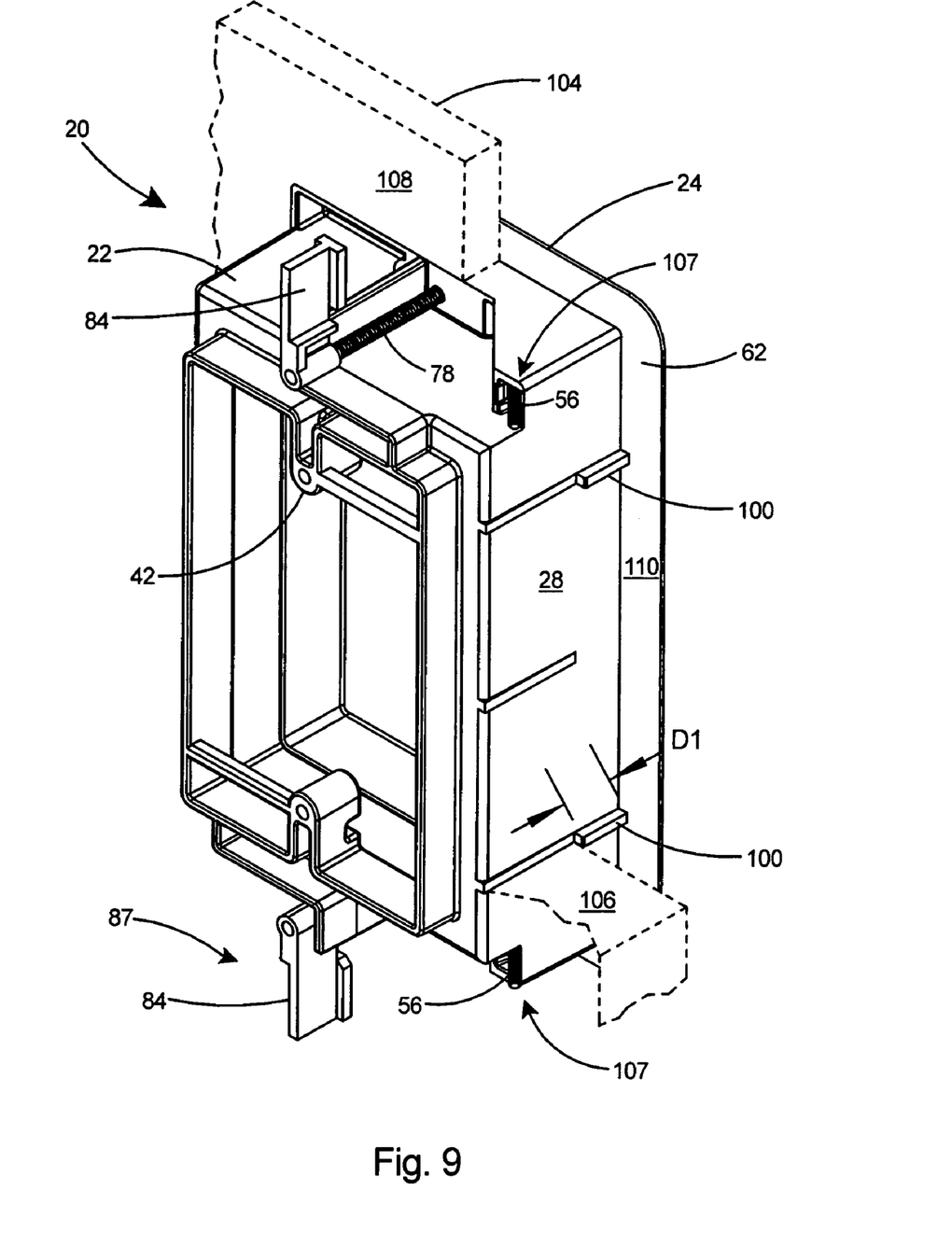
FIG. 9 is a rear perspective view of the recessed low voltage mounting assembly of FIG. 8.

Referring to FIG. 9, the lateral flange 62 includes a rear face 110 for mounting flush against the wall 104. By providing a recessed low voltage mounting assembly 20 with a trim plate 24 separate of the mounting bracket 22, the bracket 22 need not be mounted exactly flush with the wall 104. Even with the bracket 22 mounted somewhat behind the wall surface, such as with captive fastener 56 driven into stud 106, securing the trim plate 24 to the bracket 22 will draw the rear face 110 of the lateral flange 62 flush against the wall 104 thereby creating an attractive recessed mounting assembly 20 for a low voltage component. The alignment tabs 100 provide a convenient means of offsetting the low voltage mounting bracket 22 the proper distance from the front of the stud 106, a portion of which is shown in the figure, in a new construction situation to establish a proper offset when securing the bracket 22 to the stud 106 with the captive fasteners 56 and later installing the drywall 108 around the bracket 22. The alignment tabs 100 include a length D1 that establishes the proper offset for standard ½" thick drywall 108. Thus, pressing the bracket up against the stud 106 until the alignment tabs 100 make contact with the stud 106 establishes the proper position for the bracket 22, at which point the captive fasteners 56 can be driven into the stud 106. Although the captive fasteners 56 are depicted as screws in FIG. 9, they can also be nails.

The low voltage mounting bracket 22 and trim plate 24 portions of the recessed low voltage mounting assembly 20 of the present invention may be constructed of metal or plastic. In an especially preferred embodiment, the low voltage mounting bracket 22 and trim plate 24 are each molded separately in one piece of plastic.

Figure 10:
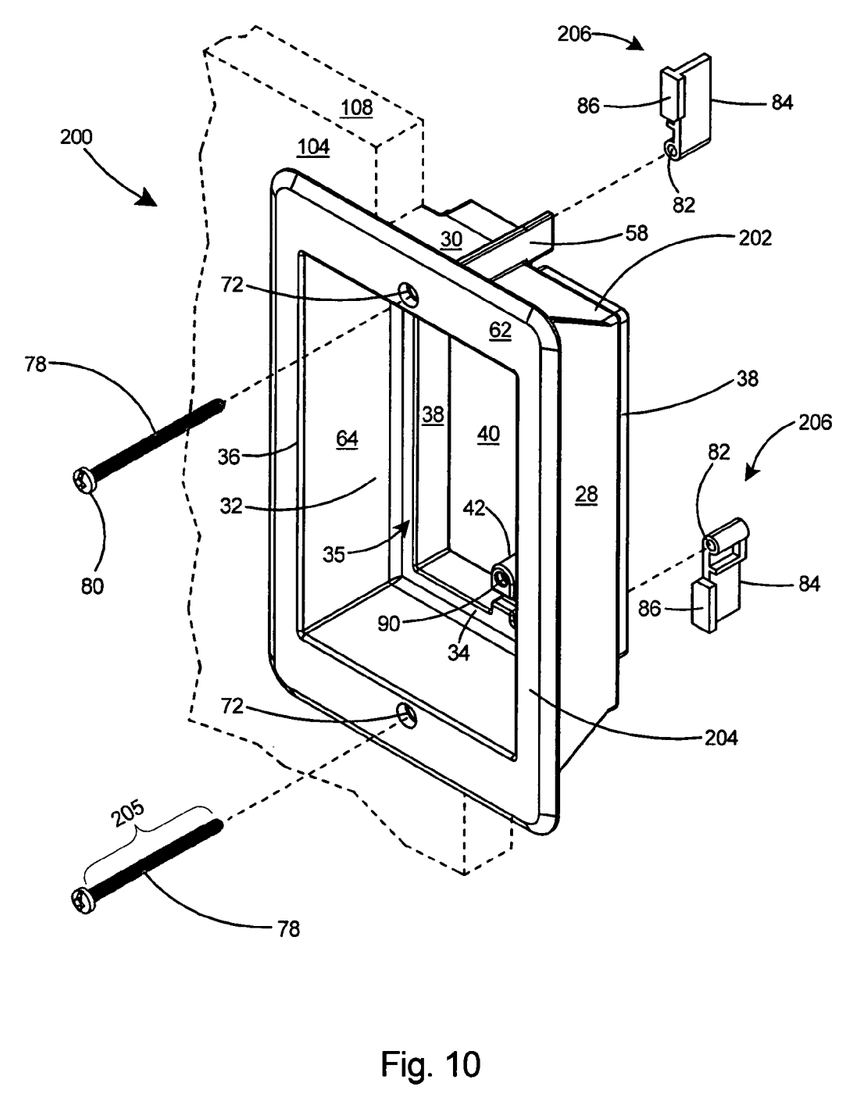
FIG. 10 is a front exploded perspective view of a one-piece embodiment of the recessed low voltage mounting assembly of the present invention.

With reference to FIG. 10, there is shown a second embodiment of the recessed low voltage mounting assembly 200. The recessed low voltage mounting assembly 200 depicted in FIG. 10 is a one-piece apparatus in which the low voltage mounting bracket 202 includes an integral trim plate 204. The assembly 200 includes an aperture 72 in the trim plate 204 that accommodates the flag adjustment screws 78. Flag adjustment screws 78 pass through apertures 72 and are secured into bores 82 in flags 84. The flag adjustment screws 78 include a head portion 80 and a threaded portion 205 and form a mounting arrangement 206 for securing the recessed low voltage mounting assembly 200 to a wall 104. Longitudinal braces 58 extend rearward from the trim plate 204 and provide a stop for locking the flags in proper position when they are rotated clockwise with respect to the front of the assembly 200. A lateral peripheral wall 34 having a front face 35 is provided offset at a distance from the front edge 36 of the side walls 28 and 30 and extends into the enclosure 32. The front face 35 of the lateral peripheral wall 34 provides a seat for accommodating a low voltage component (not shown) when the component is secured to the assembly 200.

Figure 11:
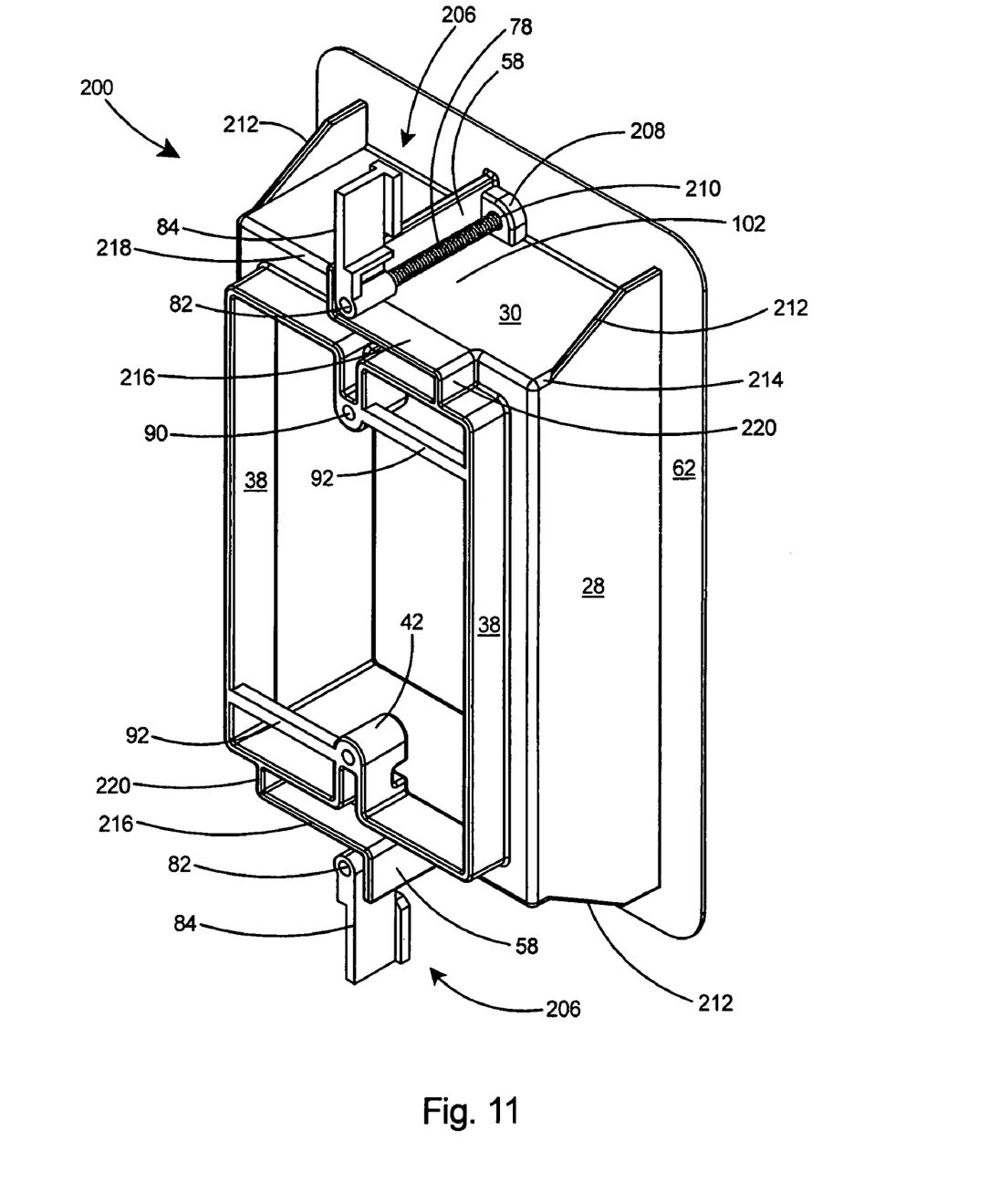
FIG. 11 is a rear perspective view of the one-piece recessed low voltage mounting assembly of FIG. 10.

Referring to FIG. 11, the lateral flange 62 of the one-piece low voltage mounting assembly 200 includes a thick wall portion 208 with an aperture 210 therein for supporting the flag adjustment screw 78 as it passes there through the flange 62. Aperture 210 is of a size larger than the threaded portion 205 of flag adjustment screw 78 to enable free rotation of the rotatable flags 84 within the lateral flange 62 of the trim plate 204. The thick wall portion 208 provides additional support along the length of screw 78 to prevent it from wobbling or moving out of the desired axial rotation as it is turned to adjust the flag 84. Four corner braces 212 are provided at the sidewall edges 214 where the long sidewalls 28 and short sidewalls 30 join and extend between the edge 214 and the lateral flange 62 to support the flange 62. Brace members 92 are provided between each boss 42 and the longitudinal wall 38 to brace and strengthen the bosses 42. A horizontal brace 216 extends along the rear edge 218 of the short sidewall 30 and joins the longitudinal brace 58 at one end. A vertical brace 220 extends from the opposite end of the horizontal brace 216 to the longitudinal wall 38 thereby bracing and strengthening the longitudinal wall 38 portion of the low voltage mounting assembly 200.

With reference to FIG. 10, the one-piece low voltage mounting assembly 200 enables an installer to easily mount a low voltage device (not shown) recessed within a wall. The one-piece assembly 200 is ideal for recessing a low voltage device in an old work situation. The installer simply makes an appropriate sized hole to accommodate the sidewalls 28 and 30 of the low voltage bracket 202, rotates the flags 84 counterclockwise so that they are flush against the short sidewalls 30, and slides the low voltage bracket 202 into the hole until the trim plate 204 is flush against the wall 104. The flag adjustment screws 78 are then rotated clockwise and tightened until the flat face 86 of the flags 84 are clamp the assembly 200 to the wall 104. The flags 84 and trim plate 204 will clamp the low voltage assembly 200 to the wall 104.

The advantage provided by the one-piece low voltage mounting assembly 200 is ease of manufacture. The main portion of the one piece low voltage mounting assembly 200, including the low voltage bracket 202 and integral trim plate 204, are molded in one piece of plastic thereby enabling low unit production cost. The completed low voltage mounting assembly 200 includes the flag adjustment screws 78 and flags 84, with the flag adjustment screws 78 threaded partially into the bores 82 of the flags 84. The flag adjustment screws 78 and flags 84 form a mounting arrangement 206 for mounting the low voltage mounting assembly to a wall. The mounting arrangement 206 includes rotatable flags 84 that may be rotated to draw the flags 84 toward the trim plate 204 for securing the recessed low voltage mounting assembly 200 to the wall 104.

Having thus described the invention with reference to a preferred embodiment, it is to be understood that the invention is not so limited by the description herein but is defined as follows by the appended claims.

What is claimed is:

1. A recessed low voltage mounting assembly for recessing a low voltage electrical component within a wall comprising:
    a low voltage mounting bracket including short sidewalls and long sidewalls having a front edge and a rear edge;
    a trim plate integral with and extending from said front edge of said short sidewalls and said long sidewalls, said trim plate including a lateral flange;
    a longitudinal brace extending rearward longitudinally from said lateral flange;
    a mounting arrangement including rotatable flags for securing said bracket to the wall;
    said rotatable flags including flag adjustment screws having a threaded portion and head portion;
    said lateral flange of said trim plate including apertures therein in axial alignment with said flag adjustment screws; and
    said apertures in said lateral flange of said trim plate of a size larger than said threaded portion of said flag adjustment screws thereby enabling free rotation of said rotatable flags within said apertures in said lateral flange of said trim plate.

2. The recessed low voltage mounting assembly of claim 1 wherein
    each of said rotatable flags include a flag member having a bore therein;
    each of said flag adjustment screws extend into said bore of said flag member; and
    rotation of said flag adjustment screws draw said flag member toward said lateral flange of said trim plate.

3. The recessed low voltage mounting assembly of claim 1 wherein said low voltage mounting bracket includes
    a low voltage boss including a flat face thereon;
    said low voltage boss is at a distance from said front edge of said short sidewalls thereby recessing the low voltage electrical component within the wall.

4. The recessed low voltage mounting assembly of claim 3 including
    a lateral peripheral wall extending inward from said short sidewalls and long sidewalls of said bracket, said lateral peripheral wall including a front face;
    a longitudinal wall extending rearward from said lateral peripheral wall to a rear edge and framing a rear opening therein; and
    said flat face of said boss is flush with said front face of said lateral peripheral wall.

5. The recessed low voltage mounting assembly of claim 4 including
    said longitudinal brace extending rearward longitudinally from said lateral flange to said rear edge of said longitudinal wall;
    a recessed area defined by said longitudinal brace and said lateral flange, said recessed area providing space for said rotatable flags to nest when said rotatable flags are rotated to a counterclockwise position; and
    said longitudinal brace providing a stop for stopping the rotation of said rotatable flags when said flags are rotated clockwise and stopping said rotatable flags in a position perpendicular to said short sidewalls of said low voltage mounting bracket.

6. The recessed low voltage mounting assembly of claim 1 including a thick wall portion extending rearward from said lateral flange, said thick wall portion including an aperture therein for supporting each of said flag adjustment screws;

sidewall edges between said long sidewalls and said short sidewalls of said low voltage mounting bracket;

corner braces extending between said sidewall edges and said lateral flange;

a horizontal brace extending along said rear edge of said short sidewall; and a vertical brace extending between said horizontal brace and said longitudinal wall.

7. A recessed low voltage mounting assembly for recessing a low voltage electrical component within a wall comprising:

a low voltage mounting bracket including short sidewalls, long sidewalls, and a wide flange extending along each of said short sidewalls;

a trim plate including a lateral flange and a rearward extending peripheral flange;

a longitudinal brace extending rearward longitudinally from said wide flange;

a mounting arrangement including rotatable flags for securing said bracket to the wall;

a fastening arrangement for securing said trim plate to said bracket;

said rotatable flags including flag adjustment screws having heads thereon;

said lateral flange of said trim plate including apertures therein in axial alignment with said flag adjustment screws; and said apertures in said lateral flange of said trim plate of a size larger than said heads of said flag adjustment screws thereby enabling rotation of said rotatable flags with said trim plate secured to said mounting bracket.

8. The recessed low voltage mounting assembly of claim 7 wherein said flag adjustment screws extend through said lateral flange of said trim plate and through said wide flange of said bracket;

each of said rotatable flags include a flag member having a bore therein;

each of said flag adjustment screws extend into said bore of said flag member; and rotation of said flag adjustment screws draw said flag member toward said lateral flange of said trim plate.

9. The recessed low voltage mounting assembly of claim 8 including a second mounting arrangement for securing said bracket to the wall; and said second mounting arrangement including captive fasteners held therein in said wide flange of said low voltage mounting bracket.

10. The recessed low voltage mounting assembly of claim 9 wherein said wide flanges include a double-walled extension having an opening therein;

a short lateral wall extending across said opening of said double-walled extension; and an aperture in said short lateral wall.

11. The recessed low voltage mounting assembly of claim 10 wherein said captive fastener of said second mounting arrangement is held therein in said aperture of said short lateral wall.

12. The recessed low voltage mounting assembly of claim 11 wherein said short sidewalls of said low voltage mounting bracket include a front edge; and said captive fastener is at an angle of between 40 and 50 degrees with respect to said front edge of said short sidewalls.

13. The recessed low voltage mounting assembly of claim 12 wherein said low voltage mounting bracket includes a low voltage boss including a flat face thereon;

said boss is at a distance from said front edge of said short sidewalls thereby recessing the low voltage electrical component within the wall.

14. The recessed low voltage mounting assembly of claim 13 including a lateral peripheral wall extending inward from said short sidewalls and said long sidewalls, said lateral peripheral wall including a front face;

a longitudinal wall extending rearward from said lateral peripheral wall to a rear edge and framing a rear opening therein; and said flat face of said boss is flush with said front face of said lateral peripheral wall.

15. The recessed low voltage mounting assembly of claim 14 including said longitudinal brace extending rearward longitudinally from said wide flange to said rear edge of said longitudinal wall;

a recessed area defined by said longitudinal brace and said wide flange, said recessed area providing space for said rotatable flags to nest when said rotatable flags are rotated to a counterclockwise position; and said longitudinal brace providing a stop for stopping the rotation of said rotatable flags when said rotatable flags are rotated clockwise, said longitudinal brace stopping said rotatable flags in a position perpendicular to said short sidewalls of said low voltage mounting bracket.

16. The recessed low voltage mounting assembly of claim 7 wherein said long sidewalls and said short sidewalls of said low voltage mounting bracket include an enclosure therein; and said rearward extending peripheral flange of said trim plate is of a slightly smaller size than said enclosure of said low voltage mounting bracket thereby enabling said trim plate to align with and nest within said low voltage mounting bracket when said trim plate is pressed therein.

17. The recessed low voltage mounting assembly of claim 8 including a threaded bore and an aperture in said wide flange of said low voltage mounting bracket;

a first aperture and second aperture said lateral flange of said trim plate; and said first aperture of said trim plate is in axial alignment with said threaded bore in said low voltage mounting bracket and said second aperture of said trim plate is in axial alignment with said aperture of said low voltage mounting bracket when said trim plate is nested within said low voltage mounting bracket.

18. The recessed low voltage mounting assembly of claim 17 wherein said fastening arrangement includes a fastener for insertion through said first aperture of said trim plate into said threaded bore in said low voltage mounting bracket.

19. The recessed low voltage mounting assembly of claim 17 wherein said flag adjustment screws extend through said second apertures in said trim plate and through said apertures in said wide flange of said low voltage mounting bracket and terminate in said bore in said flag member, and said flag adjustment screws turn freely in said second apertures in said trim plate and said apertures in said wide flange of said low voltage mounting bracket thereby enabling rotation of said flag member with rotation of each of said flag adjustment screws.

20. The recessed low voltage mounting assembly of claim 7 including an alignment tab extending outwards from said long sidewall of said low voltage mounting bracket;

said alignment tab enabling alignment of said low voltage mounting bracket at a proper depth with respect to a stud thereby enabling the front edge of said bracket to align flush with the face of the wall.

* * * * *